(12) United States Patent
Vorsprach et al.

(10) Patent No.: US 9,110,601 B2
(45) Date of Patent: Aug. 18, 2015

(54) BACKUP LIFECYCLE MANAGEMENT

(71) Applicants: Bernd Vorsprach, Berlin (DE);
Christoph Bautz, Berlin (DE); Henrik Hempelmann, Havelberg (DE); Martin E. Brunzema, Berlin (DE)

(72) Inventors: Bernd Vorsprach, Berlin (DE);
Christoph Bautz, Berlin (DE); Henrik Hempelmann, Havelberg (DE); Martin E. Brunzema, Berlin (DE)

(73) Assignee: SAP SE, Walldorf (DE)

( * ) Notice: Subject to any disclaimer, the term of this patent is extended or adjusted under 35 U.S.C. 154(b) by 194 days.

(21) Appl. No.: 13/925,540

(22) Filed: Jun. 24, 2013

(65) Prior Publication Data
US 2014/0379660 A1    Dec. 25, 2014

(51) Int. Cl.
*G06F 17/00*  (2006.01)
*G06F 3/06*  (2006.01)

(52) U.S. Cl.
CPC ............ *G06F 3/0649* (2013.01); *G06F 3/0608* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,515,502 A | 5/1996 | Wood | |
| 5,799,305 A | 8/1998 | Bortvedt et al. | |
| 5,832,508 A | 11/1998 | Sherman et al. | |
| 6,324,548 B1 | 11/2001 | Sorenson | |
| 6,640,217 B1 * | 10/2003 | Scanlan et al. | 1/1 |
| 7,127,577 B2 | 10/2006 | Koning et al. | |
| 7,363,444 B2 | 4/2008 | Ji | |
| 7,395,387 B2 | 7/2008 | Berkowitz et al. | |
| 7,644,300 B1 | 1/2010 | Rao | |
| 7,651,593 B2 | 1/2010 | Prahlad et al. | |
| 7,668,880 B1 * | 2/2010 | Carroll | 707/640 |
| 7,711,912 B2 | 5/2010 | Sandrock-Grabsky | |
| 7,725,669 B1 | 5/2010 | Bingham et al. | |
| 7,743,205 B2 | 6/2010 | Massey et al. | |
| 7,882,086 B1 * | 2/2011 | Wang et al. | 707/696 |
| 7,941,404 B2 | 5/2011 | Garimella et al. | |
| 8,364,648 B1 | 1/2013 | Tang | |
| 8,386,733 B1 | 2/2013 | Tsaur et al. | |
| 8,423,731 B1 | 4/2013 | Nadathur et al. | |
| 8,433,684 B2 | 4/2013 | Munoz | |
| 8,862,547 B2 * | 10/2014 | Kramer et al. | 707/640 |
| 2004/0153615 A1 | 8/2004 | Koning et al. | |
| 2004/0249865 A1 | 12/2004 | Lee et al. | |
| 2004/0260973 A1 * | 12/2004 | Michelman | 714/13 |
| 2005/0081007 A1 * | 4/2005 | Gold et al. | 711/162 |
| 2006/0004846 A1 | 1/2006 | Murley et al. | |
| 2009/0217271 A1 * | 8/2009 | Goto | 718/100 |

(Continued)

FOREIGN PATENT DOCUMENTS

WO    2009/146011 A1    12/2009

OTHER PUBLICATIONS

"Communication: The Extended European Search Report", European Patent Office, dated Oct. 19, 2012, for European Application No. 12004423.5-2224, 6pgs.

*Primary Examiner* — Hung Le
(74) *Attorney, Agent, or Firm* — Buckley, Maschoff & Talwalkar LLC (57) ABSTRACT

A system includes determination of a plurality of backup jobs based on a backup catalog, the backup catalog comprising a plurality of records, each of the plurality of records associated with one of the plurality of backup jobs, reception of a first instruction to delete a first backup job of the plurality of backup jobs, and, in response to the first instruction, addition of a first record associated with the first backup job to the backup catalog, wherein the first record indicates that the first instruction to delete the first backup job was received.

18 Claims, 11 Drawing Sheets

(56) References Cited

U.S. PATENT DOCUMENTS

| | | |
|---|---|---|
| 2010/0138692 A1* | 6/2010 | Liu .................................. 714/15 |
| 2010/0205152 A1* | 8/2010 | Ansari et al. .................. 707/654 |
| 2011/0246423 A1 | 10/2011 | Jess |
| 2012/0078855 A1 | 3/2012 | Beatty et al. |
| 2012/0209814 A1* | 8/2012 | Zhang et al. .................. 707/654 |
| 2012/0221528 A1 | 8/2012 | Renkes et al. |
| 2013/0018946 A1* | 1/2013 | Brown et al. .................. 709/203 |
| 2013/0024427 A1 | 1/2013 | Long |
| 2013/0117221 A1 | 5/2013 | Thomsen et al. |
| 2013/0117233 A1 | 5/2013 | Schreter |

* cited by examiner

| Backup Id | Host ID | Service | Name | Location | Size | Delete |
|---|---|---|---|---|---|---|
| A | ~~~~~~~~ | ~~~~~~~~~ | ~~~~~~~~~~~~ | ~~~~~~~~~~ | ~~~~ | |
| A | ~~~~~~~~ | ~~~~~~~~~ | ~~~~~~~~~~~~ | ~~~~~~~~~~ | ~~~~ | |
| A | ~~~~~~~~ | ~~~~~~~~~ | ~~~~~~~~~~~~ | ~~~~~~~~~~ | ~~~~ | |
| B | ~~~~~~~~ | ~~~~~~~~~ | ~~~~~~~~~~~~ | ~~~~~~~~~~ | ~~~~ | |
| B | ~~~~~~~~ | ~~~~~~~~~ | ~~~~~~~~~~~~ | ~~~~~~~~~~ | ~~~~ | |
| B | ~~~~~~~~ | ~~~~~~~~~ | ~~~~~~~~~~~~ | ~~~~~~~~~~ | ~~~~ | |
| C | ~~~~~~~~ | ~~~~~~~~~ | ~~~~~~~~~~~~ | ~~~~~~~~~~ | ~~~~ | |
| C | ~~~~~~~~ | ~~~~~~~~~ | ~~~~~~~~~~~~ | ~~~~~~~~~~ | ~~~~ | |
| C | ~~~~~~~~ | ~~~~~~~~~ | ~~~~~~~~~~~~ | ~~~~~~~~~~ | ~~~~ | |

BACKUP LIFECYCLE MANAGEMENT

BACKGROUND

Modern database systems provide processes for generating database backup files and for using such backup files to recover from database crashes. Some systems utilize a backup catalog to specify information regarding previously-generated backup files, such as ID, host, service, location, size, etc. The backup catalog itself may be stored in the data area of a database and may therefore be backed-up during each data backup. Both the backup catalog and its corresponding backup files may become large and cumbersome over time, and systems are desired to efficiently manage these entities.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
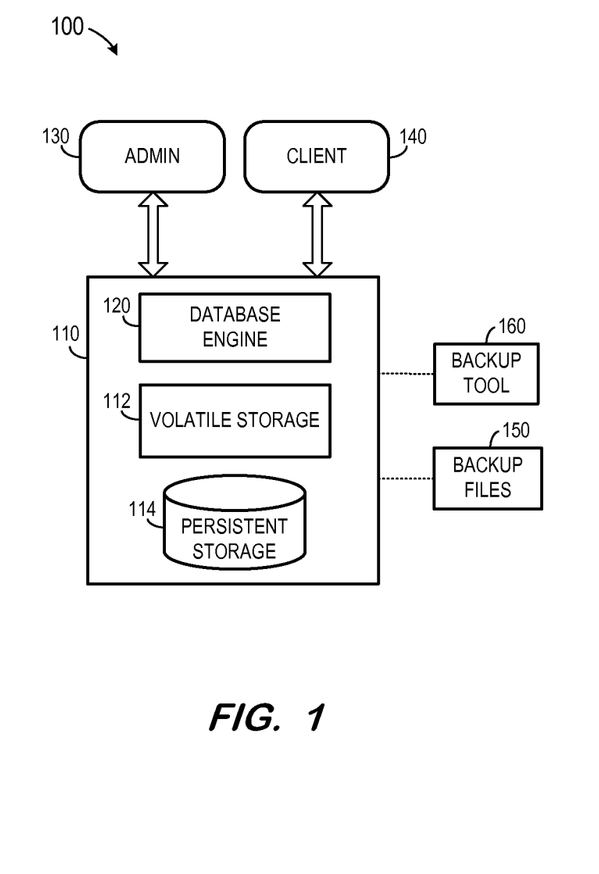
FIG. 1 is a block diagram of a system according to some embodiments.

FIG. 1 is a block diagram of system 100 according to some embodiments. System 100 includes database 110, administrator 130 and client 140. System 100 may also include one or both of backup files 150 and backup tool 160. Backup files 150 and backup tool 160 may each store data backups and/or log backups, with backup files 150 being located in a namespace of application server 120 and backup tool 160 being an external backup tool.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, multi-dimensional databases, and/or other data sources. Embodiments are not limited to any number or types of data sources. For example, database 110 may comprise one or more OnLine Analytical Processing (OLAP) databases (i.e., cubes), spreadsheets, text documents, presentations, etc.

Database 110 may implement an "in-memory" database, in which volatile (e.g., non-disk-based) storage 112 (e.g., Random Access Memory) is used both for cache memory and for storing the full database during operation, and persistent storage (e.g., one or more fixed disks) is used for offline persistency and maintenance of database snapshots. Alternatively, volatile storage 112 may be used as cache memory for storing recently-used data, while persistent storage 114 stores the full database. In some embodiments, the data of database 110 comprises one or more of conventional tabular data, row-based data stored in row format, column-based data stored in columnar format, and object-based data. Database 110 may also or alternatively support multi-tenancy by providing multiple logical database systems which are programmatically isolated from one another. Moreover, the data of database 110 may be indexed and/or selectively replicated in an index to allow fast searching and retrieval thereof.

Database 110 may store metadata describing regarding the structure, relationships and meaning of the data stored within database 110. This information may be generated by a database administrator operating administrator 120, and may include data defining the schema of database tables stored within database 110. A database table schema may specify the name of the database table, columns of the database table, the data type associated with each column, and other information associated with the database table.

Database engine 120 manages volatile storage 112 and persistent storage 114, and provides data of database 110 to database clients, such as client 140, in response to requests received therefrom.

Administrator 130 provides for management of database 110. For example, administrator 130 may define the structure of tables within database 110, may configure hosts within database 110, may schedule backup operations performed by database engine 120, and may control database engine 120 to execute post-crash recovery of database 110 based on data backups and, if desired, log backups.

Each of administrator 130 and client 140 may comprise one or more devices executing program code of a software application for presenting user interfaces to allow interaction with database engine 120. Presentation of a user interface may comprise any degree or type of rendering, depending on the type of user interface code generated by database engine 120. For example, administrator 130 may execute a Web Browser to receive a Web page (e.g., in HTML format) from database engine 120, and may render and present the Web page according to known protocols. Either administrator 130 or client 140 may also or alternatively present user interfaces by executing a standalone executable file (e.g., an .exe file) or code (e.g., a JAVA applet) within a virtual machine.

Figure 2:
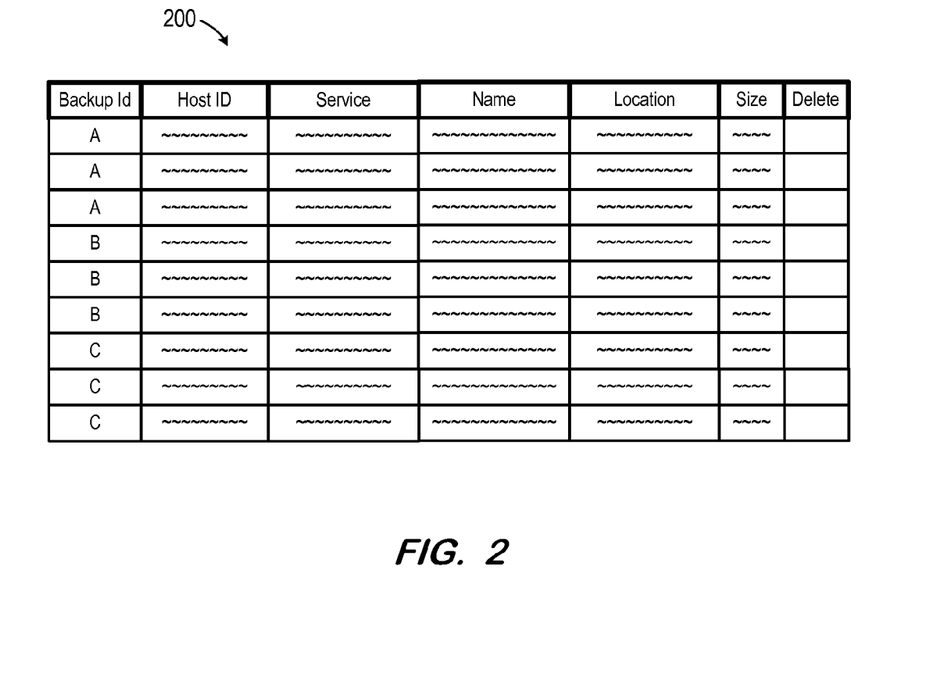
FIG. 2 is a tabular representation of a backup catalog according to some embodiments.

FIG. 2 is a tabular representation of a portion of backup catalog 200 according to some embodiments. As described above, backup catalog 200 may describe backup files which were previously generated by system 100. Backup catalog 200 may comprise a data file stored within database 110, and may be accessed by administrator 130 via an interface provided by application server 120. Embodiments are not limited to the structure and contents of backup catalog 200 as shown in FIG. 2.

Each row of backup catalog 200 corresponds to a single backup file. According to the example of FIG. 2, backup catalog includes columns identifying the backup job which created the backup file (i.e., Backup Id), the host of database 110 which corresponds to the backup file (i.e., Host Id), the Service of the host to which the backup file corresponds, a Name of the backup file, a Location of the backup file, and a delete flag. Each host of database 110 may execute one or more services according to some embodiments, and one data backup file is generated for each service during each data backup job of database 110. Accordingly, several backup files may share the same Backup Id. In the illustrated embodiment, the Location associated with a backup file in backup catalog 200 may be a local path of backup files 150 or an indicator of third-party backup tool 160. Deletion of a backup file will be described in further detail below.

Figure 3:
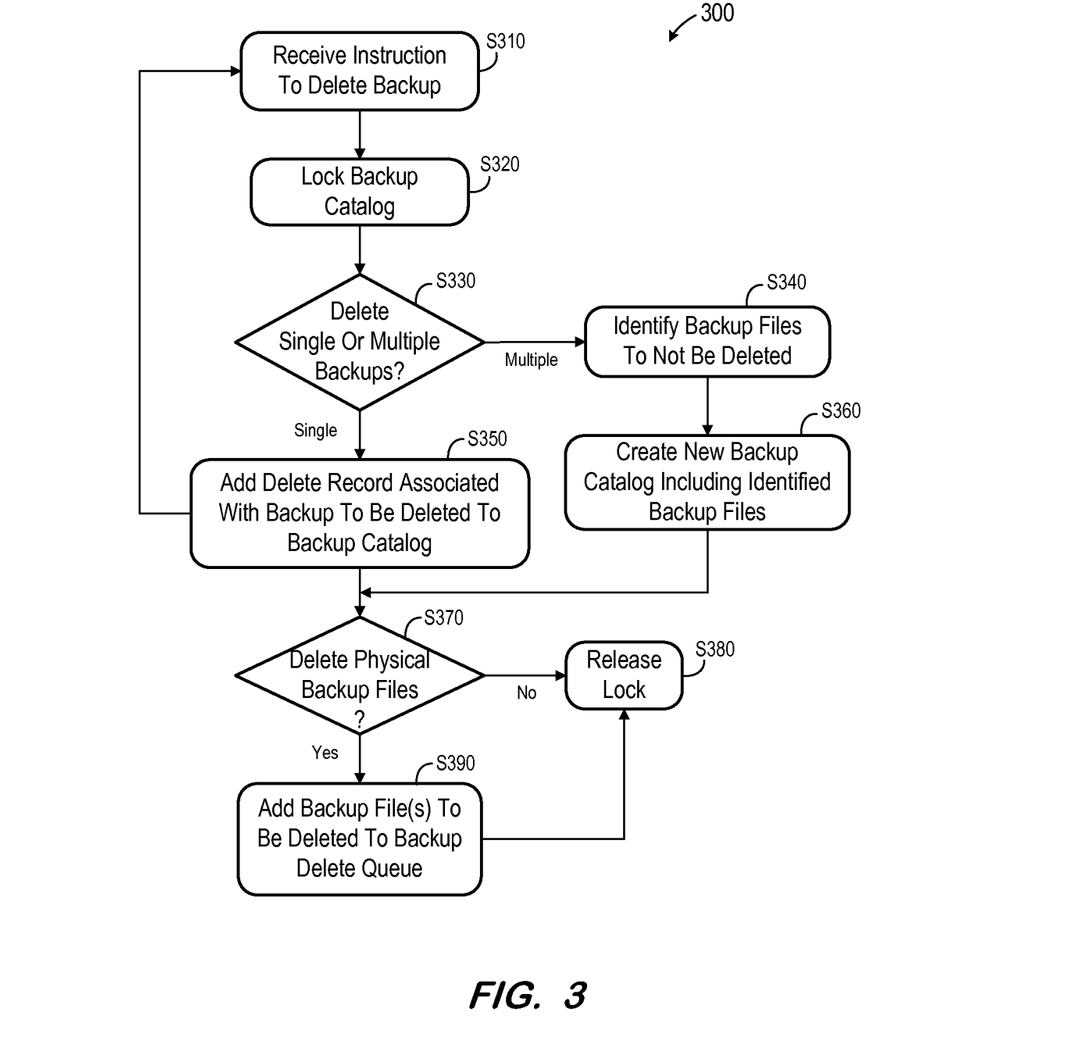
FIG. 3 is a flow diagram of a process according to some embodiments.

FIG. 3 comprises a flow diagram of process 300 according to some embodiments. In some embodiments, various hardware elements of database 110 execute program code of database engine 120 to perform process 300. Process 300 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, an instruction to delete a backup file is received at S310. In one example of S310, administrator 130 first invokes a user interface for managing backup operations. As described above, such a user interface may be generated and displayed by an application executing on administrator 130, may comprise a Web page or other interface provided to administrator 130 by database engine 120 and displayed thereby, or may be displayed by any other means.

Figure 4:
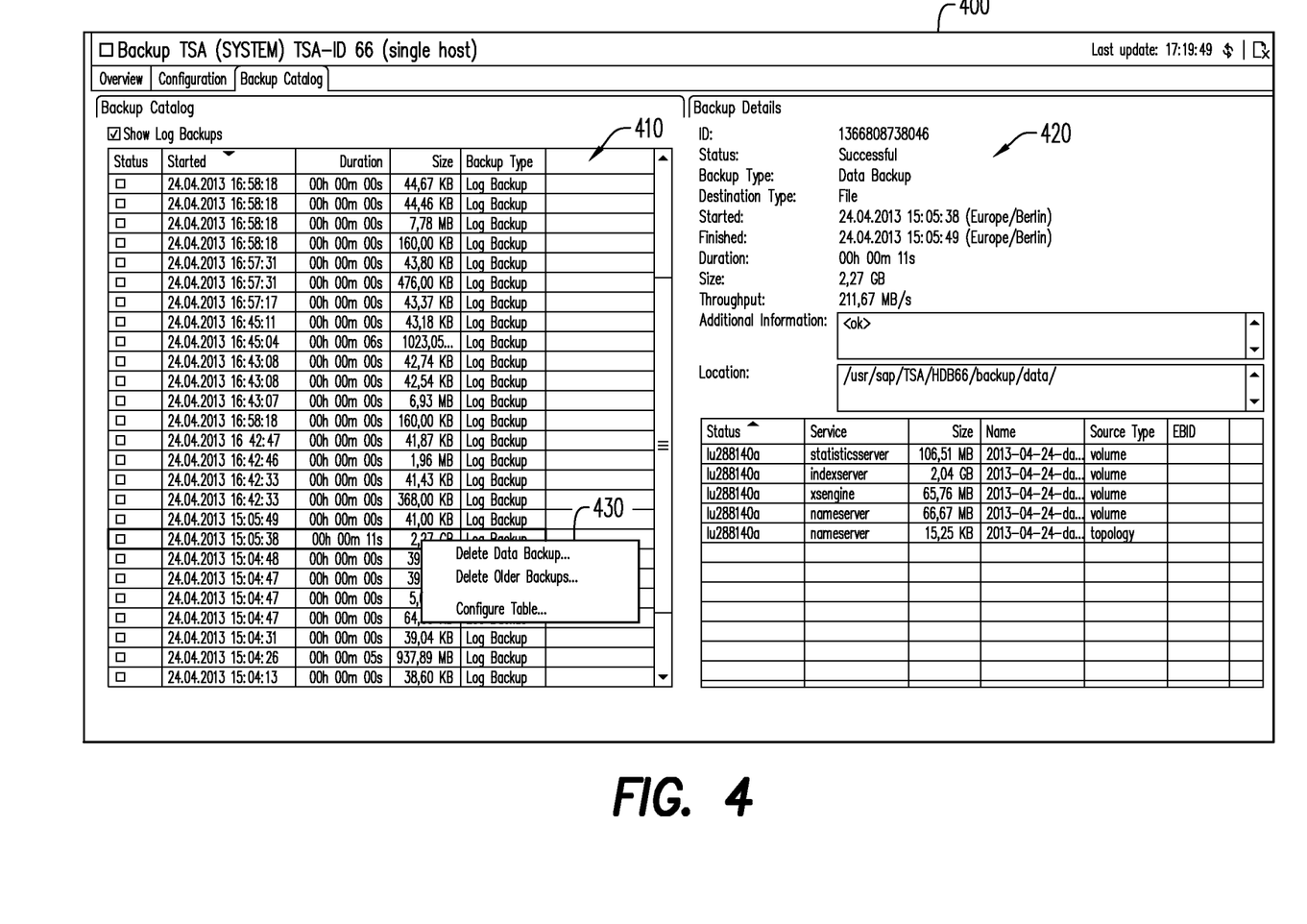
FIG. 4 is an outward view of a user interface for managing backups according to some embodiments.

FIG. 4 is an outward view of user interface 400 according to some embodiments. Embodiments may utilize any other user interface or system for receiving the instruction at S310. User interface 400 displays information stored in the backup catalog. For example, list 410 includes one row for each backup job represented in the backup catalog. These backup jobs may consist of log backups or data backups. Area 420 shows detailed information associated with a backup job which is selected in area 410. Database engine 120 may read this information from the backup catalog described herein.

Table 430 of area 420 indicates the various backup files which were created during the selected backup job. In the illustrated example, the selected backup job created five data backup files. Specifically, one data backup file was created for each service of the database, and another data backup file was created to back up the database topology.

Figure 5:
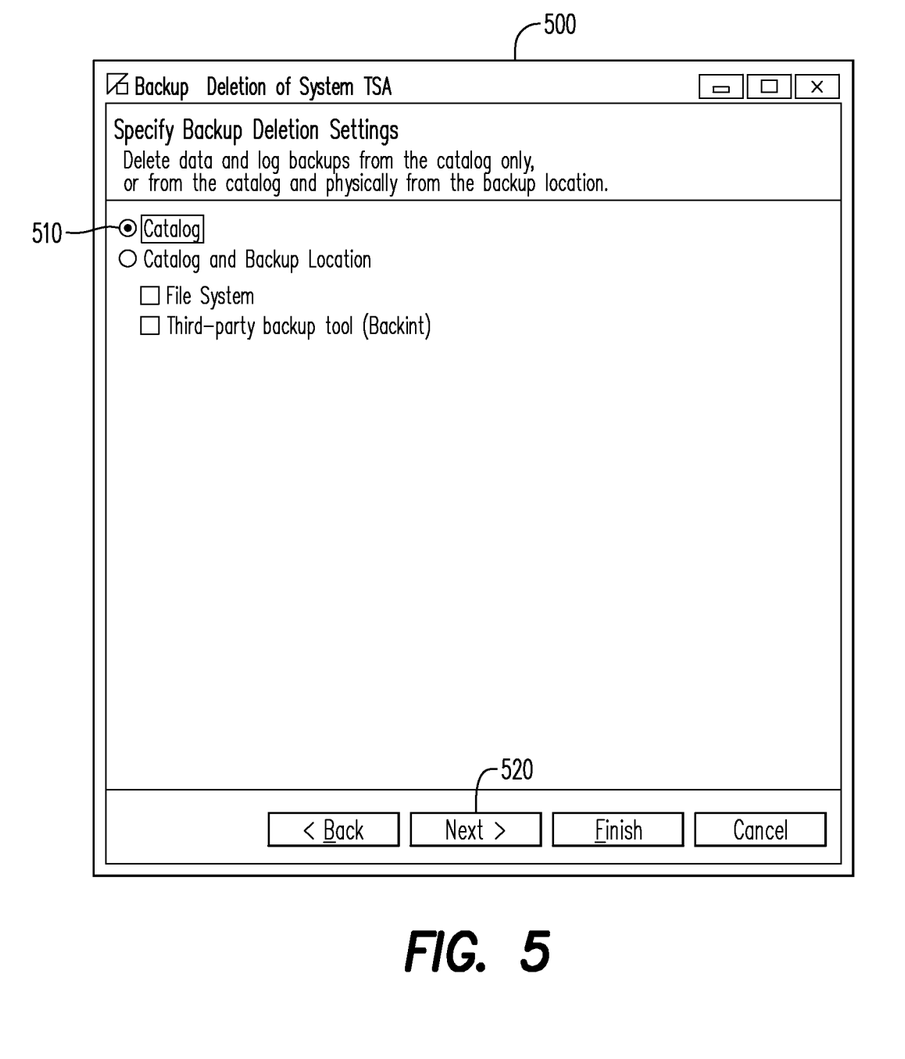
FIG. 5 is an outward view of a user interface dialog box according to some embodiments.

As shown in FIG. 4, an administrator has selected a data backup file from list 410. Such a selection may comprise a "right-click" resulting in display of context menu 430. For purposes of the present example, it will be assumed that the administrator selects "Delete Data Backup . . ." from context menu 430. In response, dialog box 500 of FIG. 5 is displayed.

Dialog box 500 allows the administrator to specify whether the backup files associated with the selected backup job should only be deleted from the backup catalog or from both the backup catalog and from physical storage. Continuing with the example, the administrator selects radio button 510 to specify that the backup files associated with the selected backup job should only be deleted from the backup catalog, and then selects Next button 510.

Figure 6:
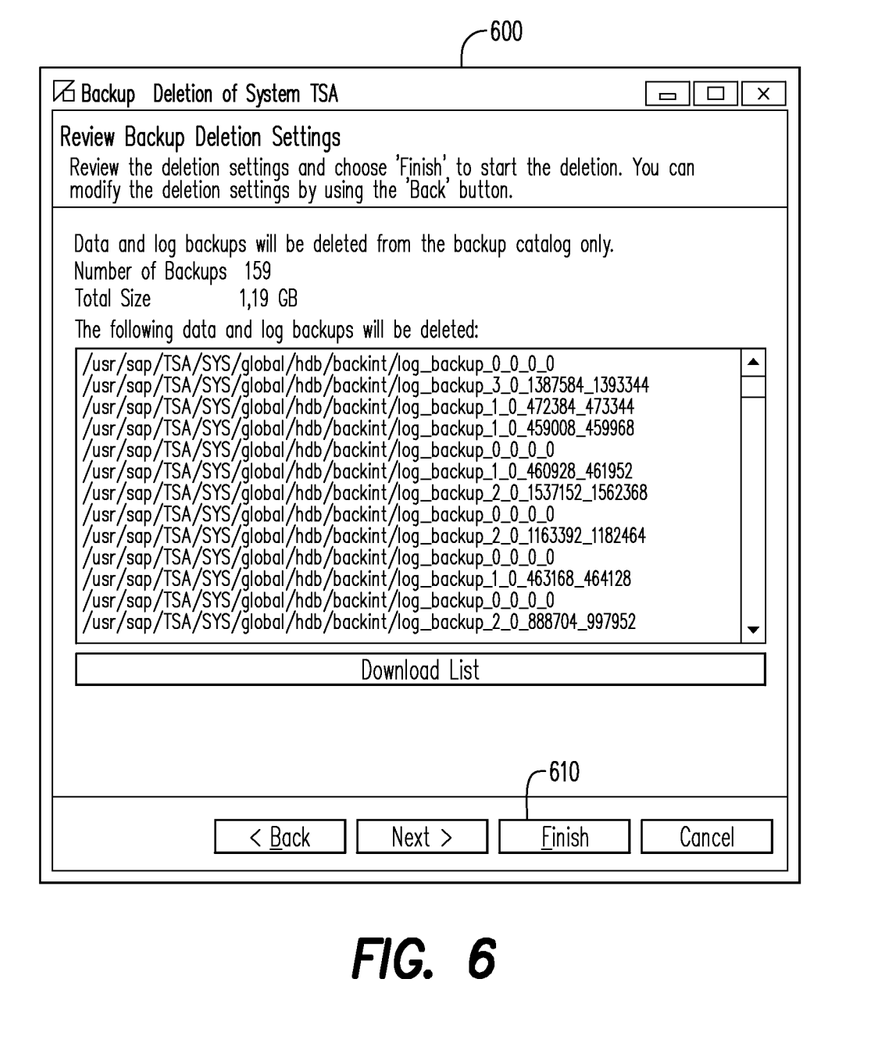
FIG. 6 is an outward view of a user interface dialog box according to some embodiments.

Dialog box 600 of FIG. 6 is displayed in response to selection of Next button 510. Dialog box 600 displays the backup files which will be deleted (i.e., from the backup catalog only) upon selection of Finish button 610. These files include the data backup files shown in table 430 as well as log backup files which correspond to those data backup files. Generally, these log backup files correspond to logs which were created after the data backup files but before the next subsequent data backup job. In other words, the log backup files to be deleted are those which describe changes to the database which occurred after the selected backup job but before a next backup job.

The instruction to delete a backup job is received at S310 in response to selection of Finish button 610. Database engine 120 therefore locks the backup catalog at S320 to prevent any changes thereto, and then determines whether the instruction comprises an instruction to delete one backup job or to delete multiple backup jobs. Continuing the present example, flow proceeds from S330 to S350 because only one backup job was selected in area 410.

Figure 7:
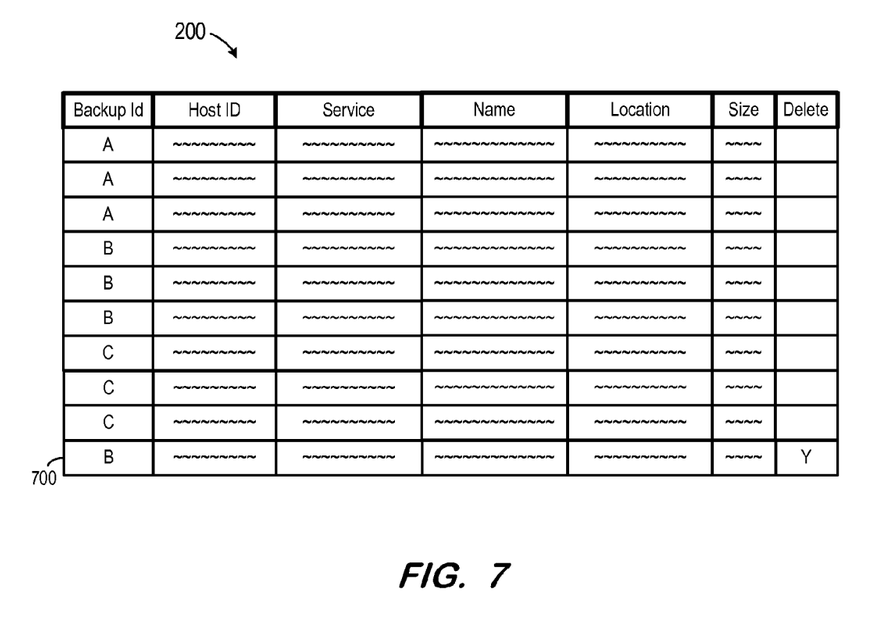
FIG. 7 is a tabular representation of a backup catalog according to some embodiments.

A record associated with the backup job to be deleted is added to the backup catalog at S350. FIG. 7 illustrates backup catalog 200 after addition of record 700 according to some embodiments of S350. Record 700 is associated with the backup job having Backup Id "B" and includes a Delete flag "Y". Record 700 indicates that an instruction to delete the backup job having Backup Id "B" has been received. Embodiments are not limited to the use of a Delete flag; this indication may be signified in any manner according to some embodiments.

Record 700 may be used to determine the backup jobs to display in area 410 of user interface 400. For example, upon receipt of an instruction to view the contents of or otherwise access backup catalog 200, database engine 120 parses backup catalog 200 to determine the backup jobs represented therein, and presents the determined backup jobs. This determination omits any backup jobs which are associated with a delete flag. Therefore, if database engine 120 locates a record of backup catalog 200 (e.g., record 700) which indicates that an instruction has been received to delete a particular backup job (e.g., Backup Id B), database engine 120 does not display the particular backup job in area 410, despite any other records which might be associated with this backup job in backup catalog 200.

According to some embodiments, backup catalog 200 is saved in database 110 as a linked list. Consequently, it may be advantageous to add a record to the linked list as described with respect to S350 instead of attempting to delete all records associated with the selected backup job and to correspondingly reconfigure the linkages of the linked list.

Returning to process 300, it is determined at S370 whether an instruction was received to delete the physical backup files associated with the selected backup job. In the present example, it was specified in user interface 500 to delete the backup job only from the backup catalog. Flow therefore proceeds to S380 to release the lock which was placed at S320.

Figure 8:
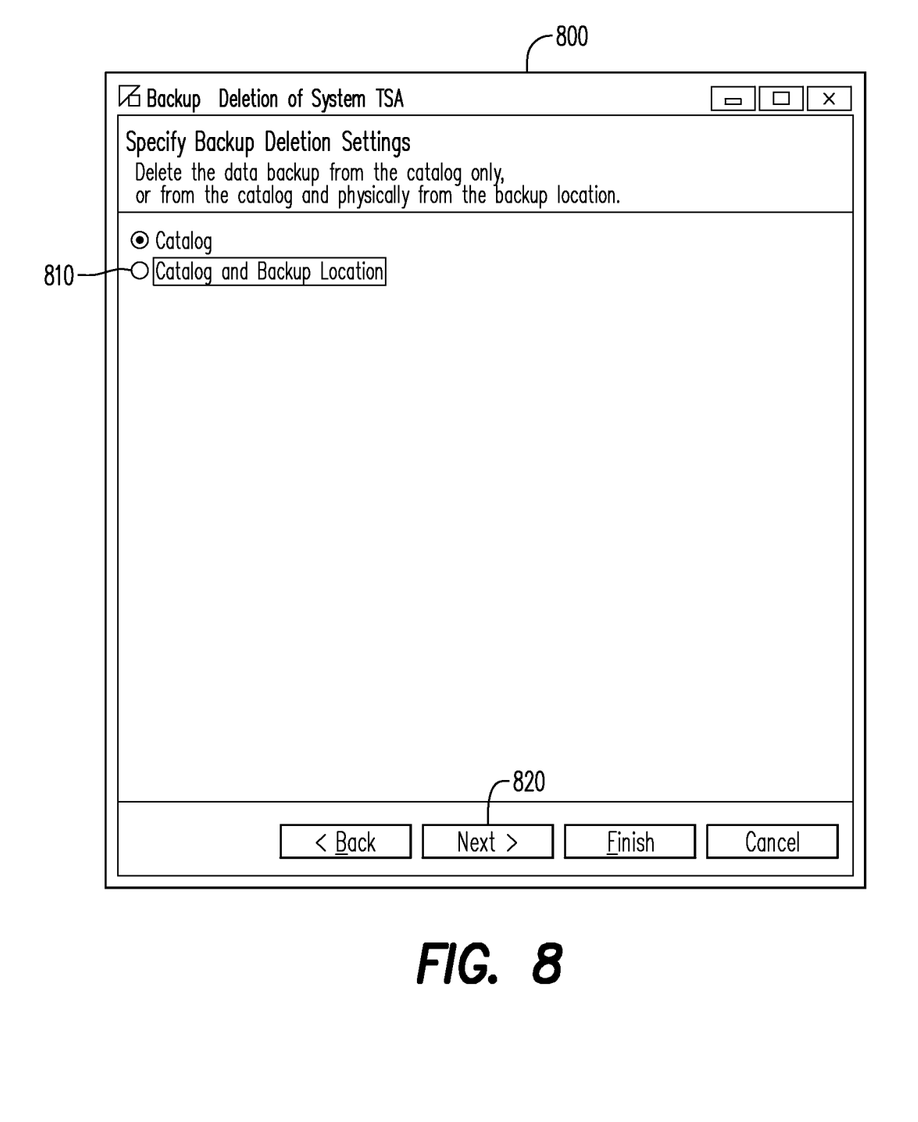
FIG. 8 is an outward view of a user interface dialog box according to some embodiments.

It will now be assumed that an instruction was received at S310 to delete more than one backup job. For example, the administrator may have selected "Delete Older Backups" from context menu 430 of interface 400. In response, dialog box 800 is displayed to allow the administrator to specify whether the backup files associated with the selected backup job should only be deleted from the backup catalog or from both the backup catalog and from physical storage. As shown, the administrator has selected radio button 810 to specify that the backup files associated with the selected backup job should be deleted from the backup catalog and from their physical backup locations.

Figure 9:
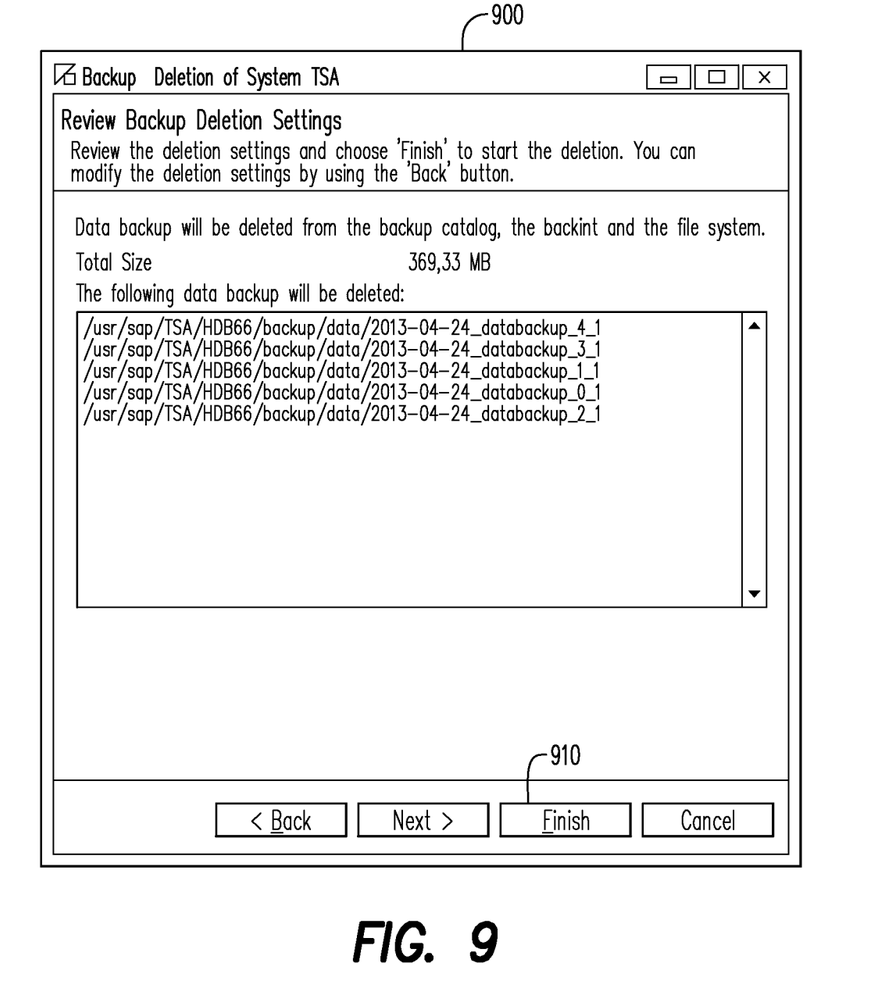
FIG. 9 is an outward view of a user interface dialog box according to some embodiments.

Dialog box 900 of FIG. 9 is displayed after selection of Next button 820. Dialog box 900 displays the backup files which will be deleted (i.e., from the backup catalog and from their respective storage locations) after selection of Finish button 910.

Accordingly, the instruction to delete a backup job is received at S310 in response to selection of Finish button 910. Database engine 120 then locks the backup catalog at S320, and determines at S330 that the instruction comprises an instruction to delete multiple backup jobs. Flow therefore proceeds to S340.

At S340, database engine 120 identifies backup files from the backup catalog which are not to be deleted. According to some embodiments, the identified backup files are those which are not associated with a Backup Id of a backup job for which an instruction to delete was received at S310. For example, if a backup job is selected in area 410 of interface 400 and the "Delete Older Backups" operation is selected, S340 may comprise identifying backup files of the selected backup job as well as backup files of all backup jobs which were executed more recently than the selected job. Next, at S360, a new backup catalog is created including records corresponding to the backup files which were identified at S340. Database engine 120 may also update backup catalog metadata to point to the new backup catalog.

A new backup catalog is created at S340 as an alternative to adding "Delete" records associated with each deleted backup job as described with respect to S350. This alternative represents a trade-off between 1) increased size of the backup catalog and increased time to parse the backup catalog and 2) time required to create a new backup catalog. According to some embodiments, the decision at S330 to proceed to S340 or S350 may be based on a threshold number of greater than one.

Continuing the current example, flow proceeds to S370 and then to S390. At S380, any backup files to be deleted (i.e., the backup files of the backup jobs to be deleted) are added to a backup delete queue. Addition of a backup file to the backup delete queue may comprise adding a record to the backup delete queue including a name, location, Backup Id and other identifying information of the backup file. Flow then continues to S380 to release the lock which was placed at S320.

In some embodiments, the backup delete queue is processed by a thread of database engine 120 in order to delete physical backup files from their respective locations. The thread may be executed in parallel with a thread responsible for execution of process 300 of FIG. 3.

Figure 10:
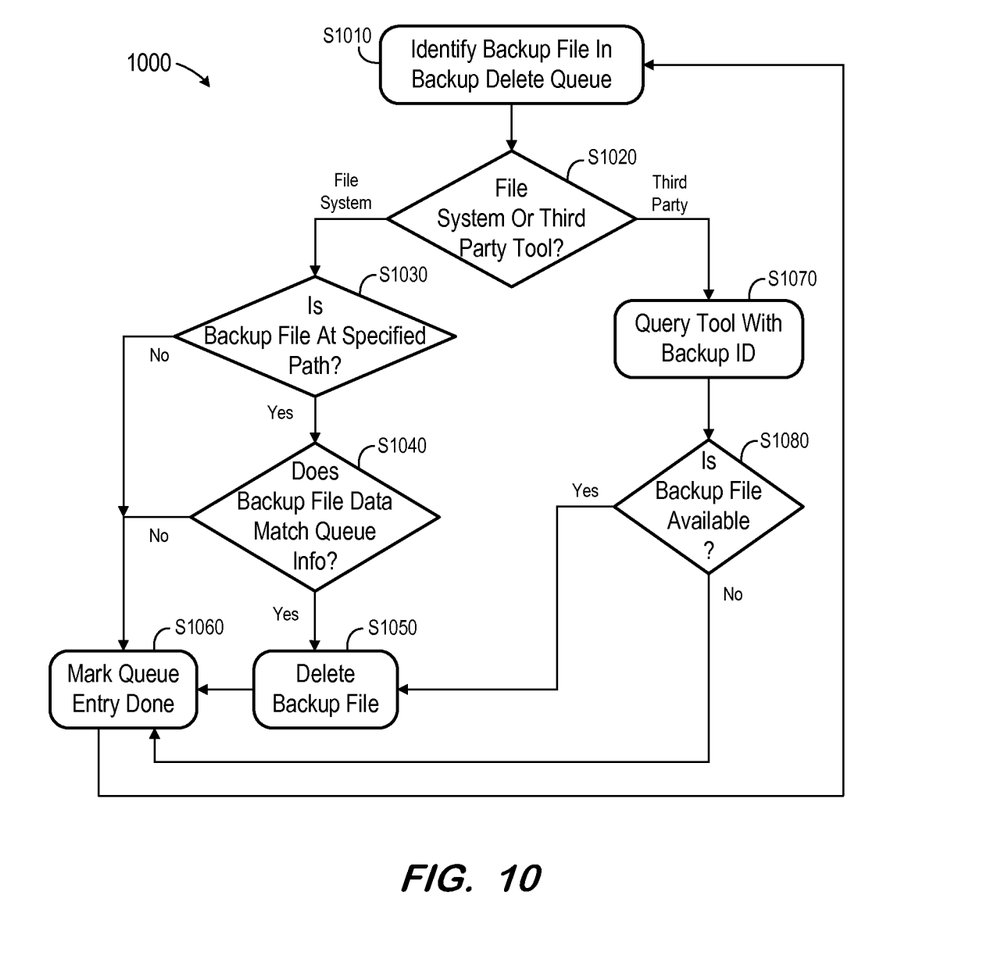
FIG. 10 is a flow diagram of a process according to some embodiments.

FIG. 10 illustrates process 1000 of FIG. 10 which may be performed by such a thread according to some embodiments. Initially, a backup file of the backup delete queue is identified at S1010. According to some embodiments, the identified backup file is the least-recently added backup file in the backup delete queue which has not yet been processed by process 1000.

At S1020, it is determined whether the backup file is located in the file system of database engine 120 (e.g. backup files 150) or in a third party backup tool (e.g., backup tool 160). As described above, the location may be specified in the corresponding entry of the backup delete queue.

Flow proceeds to S1030 if the backup file is located in the file system. At S1030, it is determined whether the backup file is located at the specified path of the file system. If not, the entry of the backup queue which corresponds to the backup file is marked "done" at S1060 and flow returns to S1010.

Flow proceeds from S1030 to S1040 if the backup file is located at the specified path. At S1040, it is determined whether data of the backup file matches data associated with the backup file in the backup delete queue. In this regard, S1040 may comprise reading the header of the backup file to determine whether a Backup Id, host information, and/or other data within the backup file matches corresponding data associated with the backup file in the backup delete queue. If the data do not match, the entry of the backup queue which corresponds to the backup file is marked "done" at S1060 and flow returns to S1010 as described above.

If the data are determined to match at S1040, the backup file is deleted at S1050 and the corresponding queue entry is marked "done" at S1060.

Returning to S1020, it may be determined that the identified backup file is located at (i.e., managed by) a third party backup tool. In this case, the tool is queried with an external backup identifier of the backup file at S1070. Based on the response to the query (e.g., a status of the backup file) it is determined at S1080 whether the backup file is available in the third party tool. If so, the backup file is deleted at S1050 (e.g., by instructing the tool to delete the backup file) and the corresponding entry is marked "done" at S1060. If not, the entry is simply marked "done" at S1060. Flow returns to S1010 from S1060 to identify a next backup file in the queue and to continue as described above.

Figure 11:
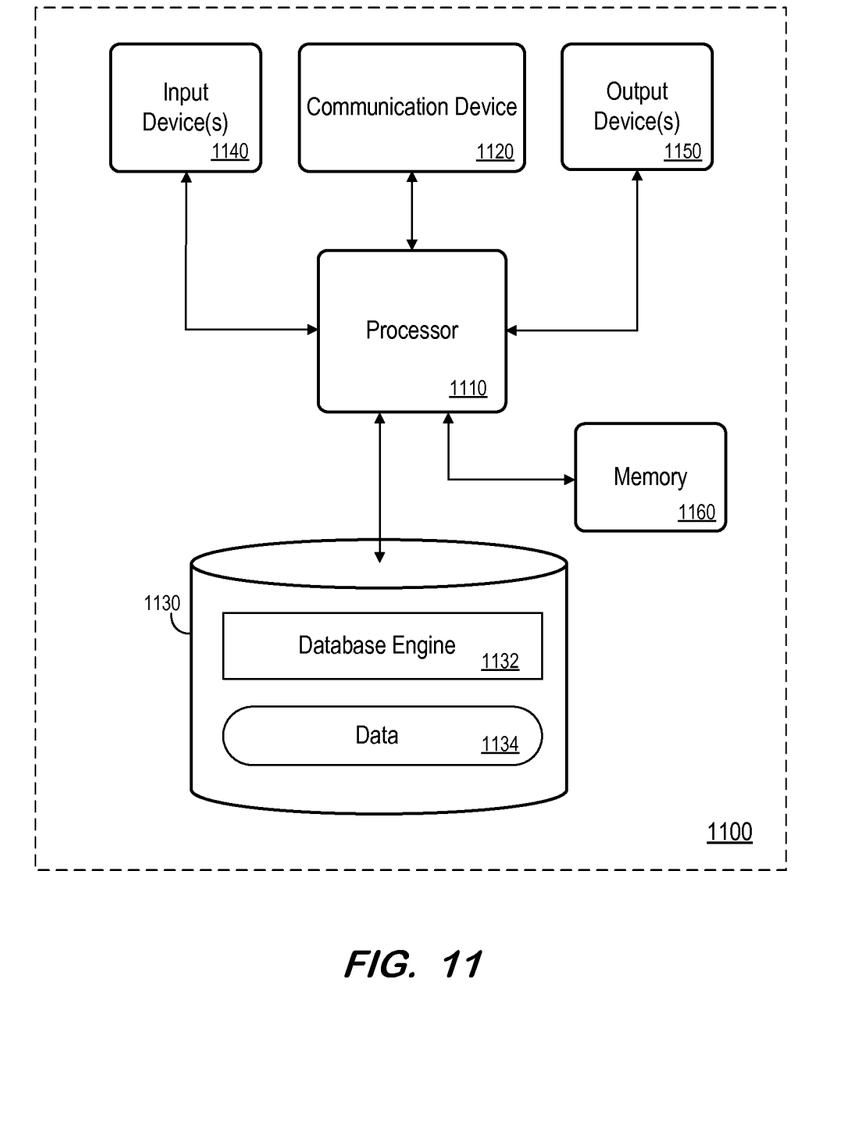
FIG. 11 is a block diagram of a system according to some embodiments.

FIG. 11 is a block diagram of system 1100 according to some embodiments. System 1100 may comprise a general-purpose computing system and may execute program code to perform any of the processes described herein. System 1100 may comprise an implementation of database 110 according to some embodiments. System 1100 may include other unshown elements according to some embodiments.

System 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Database engine 1132 may comprise program code executed by processor 1110 to cause apparatus 1100 to perform any one or more of the processes described herein. Embodiments are not limited to execution of these processes by a single apparatus. Data 1134 may include the data of database 110 as described above. As also described above, database 110 may be implemented using volatile memory such as memory 1160. Data storage device 1130 may also store data and other program code for providing additional functionality and/or which are necessary for operation of system 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those skilled in the art will recognize other embodiments may be practiced with modifications and alterations to that described above.

What is claimed is:

1. A computing system comprising:
    a memory storing processor-executable program code; and
    a processor to execute the processor-executable program code in order to cause the computing system to:
        determine a plurality of backup jobs based on a backup catalog, the backup catalog comprising a plurality of records, each of the plurality of records associated with one of the plurality of backup jobs;
        receive a first instruction to delete a first backup job of the plurality of backup jobs; and
        in response to the first instruction, add a delete record associated with the first backup job to the backup catalog,
        wherein the delete record indicates that the first instruction to delete the first backup job was received.

2. A computing system according to claim 1, wherein the processor is further to execute the processor-executable program code in order to cause the computing system to:
    receive an instruction to access the backup catalog;
    in response to the instruction, determine a second plurality of backup jobs based on the backup catalog, the second plurality of backup jobs not including the first backup job; and
    present the second plurality of backup jobs.

3. A computing system according to claim 1, wherein the processor is further to execute the processor-executable program code in order to cause the computing system to:
    determine whether the first instruction comprises an instruction to delete one or more physical backup files associated with the first backup job; and
    if it is determined that the first instruction comprises an instruction to delete one or more physical backup files associated with the first backup job, delete the one or more physical backup files.

4. A computing system according to claim 3, wherein the processor is further to execute the processor-executable program code in order to cause the computing system to:
    receive a second instruction to delete two or more of the plurality of backup jobs; and
    in response to the second instruction:
        identify records of the backup catalog which are not associated with the two or more backup jobs; and
        create a second backup catalog including the identified records.

5. A computing system according to claim 4, wherein the processor is further to execute the processor-executable program code in order to cause the computing system to:
    determine whether the second instruction comprises an instruction to delete one or more physical backup files associated with the second backup job and one or more physical backup files associated with the third backup job; and
    if it is determined that the second instruction comprises an instruction to delete one or more physical backup files associated with the second backup job and the one or more physical backup files associated with the third backup job, delete the one or more physical backup files associated with the second backup job and the one or more physical backup files associated with the third backup job.

6. A computing system according to claim 1, wherein the processor is further to execute the processor-executable program code in order to cause the computing system to:
    receive a second instruction to delete two or more of the plurality of backup jobs; and
    in response to the second instruction:
        identify records of the backup catalog which are not associated with the two or more backup jobs; and
        create a second backup catalog including the identified records.

7. A non-transitory computer-readable medium storing program code, the program code executable by a processor of a computing system to cause the computing system to:
    determine a plurality of backup jobs based on a backup catalog, the backup catalog comprising a plurality of records, each of the plurality of records associated with one of the plurality of backup jobs;
    receive a first instruction to delete a first backup job of the plurality of backup jobs; and
    in response to the first instruction, add a delete record associated with the first backup job to the backup catalog,
    wherein the delete record indicates that the first instruction to delete the first backup job was received.

8. A non-transitory computer-readable medium according to claim 7, wherein the program code is further executable in order to cause the computing device to:
    receive an instruction to access the backup catalog;
    in response to the instruction, determine a second plurality of backup jobs based on the backup catalog, the second plurality of backup jobs not including the first backup job; and
    present the second plurality of backup jobs.

9. A non-transitory computer-readable medium according to claim 7, wherein the program code is further executable in order to cause the computing device to:
    determine whether the first instruction comprises an instruction to delete one or more physical backup files associated with the first backup job; and
    if it is determined that the first instruction comprises an instruction to delete one or more physical backup files associated with the first backup job, delete the one or more physical backup files.

10. A non-transitory computer-readable medium according to claim 9, wherein the program code is further executable in order to cause the computing device to:
    receive a second instruction to delete two or more of the plurality of backup jobs; and
    in response to the second instruction:
        identify records of the backup catalog which are not associated with the two or more backup jobs; and create a second backup catalog including the identified records.

11. A non-transitory computer-readable medium according to claim 10, wherein the program code is further executable in order to cause the computing device to:
determine whether the second instruction comprises an instruction to delete one or more physical backup files associated with the second backup job and one or more physical backup files associated with the third backup job; and
if it is determined that the second instruction comprises an instruction to delete one or more physical backup files associated with the second backup job and the one or more physical backup files associated with the third backup job, delete the one or more physical backup files associated with the second backup job and the one or more physical backup files associated with the third backup job.

12. A non-transitory computer-readable medium according to claim 7, wherein the program code is further executable in order to cause the computing device to:
receive a second instruction to delete two or more of the plurality of backup jobs; and
in response to the second instruction:
identify records of the backup catalog which are not associated with the two or more backup jobs; and
create a second backup catalog including the identified records.

13. A computer-implemented method comprising:
determining a plurality of backup jobs based on a backup catalog, the backup catalog comprising a plurality of records, each of the plurality of records associated with one of the plurality of backup jobs;
receiving a first instruction to delete a first backup job of the plurality of backup jobs; and
in response to the first instruction, adding a delete record associated with the first backup job to the backup catalog,
wherein the delete record indicates that the first instruction to delete the first backup job was received.

14. A computer-implemented method according to claim 13, further comprising:
receiving an instruction to access the backup catalog;
in response to the instruction, determining a second plurality of backup jobs based on the backup catalog, the second plurality of backup jobs not including the first backup job; and
presenting the second plurality of backup jobs.

15. A computer-implemented method according to claim 13, further comprising:
determining whether the first instruction comprises an instruction to delete one or more physical backup files associated with the first backup job; and
if it is determined that the first instruction comprises an instruction to delete one or more physical backup files associated with the first backup job, deleting the one or more physical backup files.

16. A computer-implemented method according to claim 15, further comprising:
receiving a second instruction to delete two or more of the plurality of backup jobs; and
in response to the second instruction:
identifying records of the backup catalog which are not associated with the two or more backup jobs; and
creating a second backup catalog including the identified records.

17. A computer-implemented method according to claim 16, further comprising:
determining whether the second instruction comprises an instruction to delete one or more physical backup files associated with the second backup job and one or more physical backup files associated with the third backup job; and
if it is determined that the second instruction comprises an instruction to delete one or more physical backup files associated with the second backup job and the one or more physical backup files associated with the third backup job, deleting the one or more physical backup files associated with the second backup job and the one or more physical backup files associated with the third backup job.

18. A computer-implemented method according to claim 13, further comprising:
receiving a second instruction to delete two or more of the plurality of backup jobs; and
in response to the second instruction:
identifying records of the backup catalog which are not associated with the two or more backup jobs; and
creating a second backup catalog including the identified records.

* * * * *